United States Patent
Huh et al.

(10) Patent No.: US 12,272,073 B2
(45) Date of Patent: Apr. 8, 2025

(54) SYSTEM AND METHOD FOR REAL-TIME OBJECT DETECTION IN VIDEO

(71) Applicant: UNIVERSITY-INDUSTRY COOPERATION GROUP OF KYUNG HEE UNIVERSITY, Yongin-si (KR)

(72) Inventors: Eui-Nam Huh, Yongin-si (KR); Md. Alamgir Hossain, Yongin-si (KR); Dao Tan Tri Nguyen, Yongin-si (KR); Md. Delowar Hossain, Yongin-si (KR); Ga-Won Lee, Suwon-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 427 days.

(21) Appl. No.: 17/666,843

(22) Filed: Feb. 8, 2022

(65) Prior Publication Data
US 2022/0309679 A1    Sep. 29, 2022

(30) Foreign Application Priority Data
Mar. 26, 2021   (KR) ......................... 10-2021-0039957

(51) Int. Cl.
G06T 7/194    (2017.01)
G06T 5/70     (2024.01)
(Continued)

(52) U.S. Cl.
CPC ................ *G06T 7/194* (2017.01); *G06T 5/70* (2024.01); *G06T 7/11* (2017.01); *G06T 7/90* (2017.01)

(58) Field of Classification Search
CPC ... G06T 7/194; G06T 7/11; G06T 7/90; G06T 5/70
See application file for complete search history.

(56) References Cited

U.S. PATENT DOCUMENTS 9,489,750 B2   11/2016   Yang et al.
2015/0334398 A1*  11/2015   Socek ............... H04N 19/182
                                                375/240.26
(Continued)

FOREIGN PATENT DOCUMENTS

KR    10-1115563       3/2012
KR    10-2012-0071226  7/2012
(Continued)

OTHER PUBLICATIONS

Md. Alamgir Hossain et al., "Fast-D: When Non-Smoothing Color Feature Meets Moving Object Detection in Real-Time", IEEE Access, vol. 8, Oct. 12, 2020.

*Primary Examiner* — Andrew W Bee
*Assistant Examiner* — Winta Gebreslassie
(74) *Attorney, Agent, or Firm* — LEX IP MEISTER, PLLC

(57) ABSTRACT

A method for extracting a moving object in a video by an object detection system operated by at least one processor is provided. The method comprises receiving a certain unsmoothed frame included in the video, and if the certain frame is not a first frame of the video, calculating a pixel intensity difference between reference pixels of a reference background sample extracted from the first frame of the video and each of frame pixels of the certain frame. The method further comprises determining a segmentation of a background and a foreground in the certain frame based on the calculated pixel intensity difference and a predetermined threshold, and extracting the foreground from the certain frame as the object according to a similarity measurement value between the reference pixels and the frame pixels.

10 Claims, 5 Drawing Sheets

(51) Int. Cl.
*G06T 7/11* (2017.01)
*G06T 7/90* (2017.01)

(56) References Cited

U.S. PATENT DOCUMENTS

2018/0197294 A1* 7/2018 Pan .................... G06T 7/194
2018/0247126 A1* 8/2018 Li ...................... G06V 10/82
2018/0268556 A1* 9/2018 Karavadi ............. G06T 7/277

FOREIGN PATENT DOCUMENTS

| KR | 10-2015-0080569 | 7/2015 |
| KR | 10-1581162 | 12/2015 |
| KR | 10-2016-0043484 | 4/2016 |
| KR | 10-1998256 | 7/2019 |
| KR | 10-1995523 | 10/2019 |
| KR | 10-2019-0136959 | 12/2019 |
| KR | 10-2020-0066125 | 6/2020 |

* cited by examiner

SYSTEM AND METHOD FOR REAL-TIME OBJECT DETECTION IN VIDEO

CROSS-REFERENCE TO RELATED APPLICATION

This application claims priority to and the benefit of Korean Patent Application No. 10-2021-0039957 filed in the Korean Intellectual Property Office on Mar. 26, 2021, the entire contents of which are incorporated herein by reference.

BACKGROUND

(a) Field

The present invention relates to a system and method for detecting a moving object in a video in real time by precisely separating a foreground from a background in the video.

(b) Description of the Related Art

In general, in order to detect a moving object in a video, the video is segmented into a background and a foreground first of all. Then, the moving object is detected in the segmented video. Currently, in order to improve the detection accuracy of a moving object in a video, various methods which improve object detection accuracy after segmenting a video based on deep learning are being used.

When segmenting a video based on deep learning, the video should be segmented into the background and the foreground through calculation by pixel unit. Thus, a result of segmenting a video based on deep learning depends on a large amount of training data, a broadband network, and a high-spec resource. Therefore, large costs, such as run time and resource use, are caused in order to improve accuracy.

SUMMARY

An embodiment of the present invention provides a system and method that segments a background and a foreground using a sample matching technique per pixel and precisely and rapidly detects a moving object in a segmented video in real time.

According to an embodiment of the present invention, a method for extracting a moving object in a video by an object detection system operated by at least one processor is provided. The method includes receiving a certain unsmoothed frame included in the video, calculating a pixel intensity difference between reference pixels of a reference background sample extracted from a first frame of the video and each of frame pixels of the certain frame when the certain frame is not the first frame of the video, determining a segmentation of a background and a foreground in the certain frame based on the calculated pixel intensity difference and a predetermined threshold, and segmenting the frame pixels into the background or the foreground according to a similarity measurement value between the reference pixels and the frame pixels, and extracting the foreground from the certain frame as the object.

Receiving the certain frame may include initializing a background sample in the first frame when the certain frame is the first frame of the video, and storing the initialized background sample as the reference background sample.

Initializing the background sample may include forming a plurality of pixels constituting the first frame from a plurality of neighboring pixels of a predetermined size, and generating a background sample including R, G, and B color values of each of from a first neighboring pixel to a last neighboring pixel.

Calculating the pixel intensity difference may include extracting a difference in R value, G value, and B value between the certain frame and the frame pixels.

Calculating the pixel intensity difference may include comparing the extracted difference value with the reference background sample, respectively, and counting the similarity measurement value up by one when the pixel intensity difference is less than or equal to a predetermined threshold.

The similarity measurement value may be measured using a Manhattan distance between the frame pixel and the reference pixel.

Extracting the foreground from the certain frame as the object may include segmenting a pixel whose similarity measurement value is less than a predetermined minimum number of matches into the foreground, and segmenting a pixel whose similarity measurement value is greater than the minimum number of matches into the background.

Extracting the foreground from the certain frame as the object may include removing noise from the foreground and filling a hole included in the foreground from which the noise is removed.

The method may include updating the reference background sample with pixels segmented into the background in the certain frame, and changing the predetermined threshold.

According to another embodiment of the present invention, a system for extracting a moving object in a video is provided. The system includes an interface that receives the video from a video collection device, and a processor. The processor compares frame pixels of a certain unsmoothed frame included in the video with reference pixels of a reference background sample extracted from a first frame of the video to calculate a pixel intensity difference for each frame pixel, determines a segmentation of a background and a foreground in the certain frame based on the calculated pixel intensity difference and a predetermined threshold, and extracting the foreground as the object from the certain frame based on a similarity measurement value between each reference pixel and the frame pixels.

If the certain frame is the first frame of the video, the processor may initialize a background sample in a first frame, and store the initialized background sample as the reference background sample.

The processor may compare the frame pixels and the reference pixels, respectively, and count the similarity measurement value up by one when the pixel intensity difference is less than or equal to a predetermined threshold, and the similarity measurement value may be measured using a Manhattan distance between the frame pixel and the reference pixel.

The processor may segment a pixel whose similarity measurement value is less than a predetermined minimum number of matches into the foreground, and segment a pixel whose similarity measurement value is greater than the minimum number of matches into the background.

The processor may remove noise from the foreground and fill a hole included in the foreground from which the noise is removed.

According to an embodiment of the present invention, a moving object in a video can be rapidly detected due to precise segmentation of a background and a foreground.

In addition, a moving object in a video can be detected through a terminal because the present invention can be operable in a resource-limited terminal with low memory and CPU by reducing complexity.

DETAILED DESCRIPTION OF THE EMBODIMENTS

Figure 1:
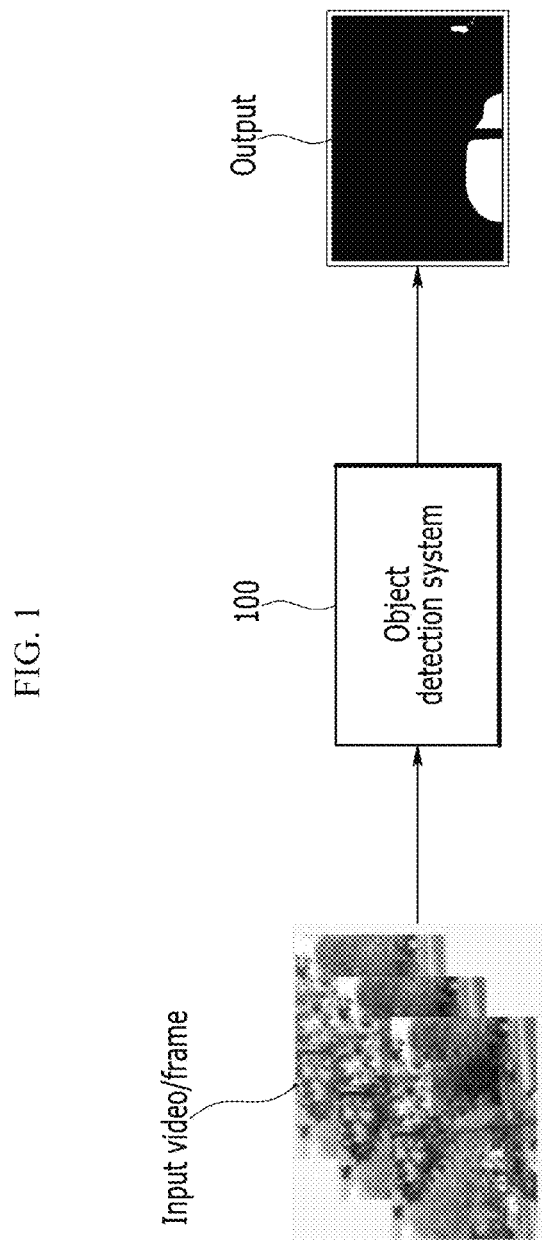
FIG. 1 is an example diagram of an object detection system according to an embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, when a part is referred to "include" or "comprise" a certain element, it means that it may further include other elements rather than exclude other elements, unless specifically indicates otherwise.

Hereinafter, a system and method for detecting an object in a video in real-time according to an embodiment of the present invention will be described in detail with reference to the drawings.

FIG. 1 is an example diagram of an object detection system according to an embodiment of the present invention.

As shown in FIG. 1, an object detection system 100 receives a color image, a color frame sequence, a black-and-white image, or a black-and-white frame sequence as an input. In the embodiment of the present invention, for convenience of description, the color image, the color frame sequence, the black-and-white image, or the black-and-white frame sequence input to the object detection system 100 is referred to as a 'input frame', but is not limited thereto.

In addition, in the embodiment of the present invention, an example of receiving an RGB color image or a color frame sequence from among various color models (e.g., YCbCr, HSI, HSV, and the like) will be described. This is because a color space of the RGB color image is the best irrespective of a lighting condition.

Further, since color and brightness information of an RGB color image is uniformly distributed in {R, G, B} channels, an RGB color image or a color frame sequence is used. In addition, since the RGB color image is robust to noise caused by a camera and environments, the RGB color image or the color frame sequence is used.

Furthermore, in an embodiment of the present invention, a color image or a color frame sequence which is not smoothed will be described as an example of the input color image or input color frame sequence. Edge information of an object in the image or frame is preserved by not applying smoothing to the color image or color frame sequence.

The object detection system 100 processes the input frame and detects a moving object in a video. For this, the object detection system 100 generates a reference background sample from a first frame of the input image and stores the generated reference background sample.

From a second frame onwards, the object detection system 100 compares pixels included in each frame (hereinafter, referred to as 'frame pixels' for convenience of description) with pixels of the reference background sample (hereinafter, referred to as 'reference pixels' for convenience of description). Then, the object detection system 100 determines whether to segment a frame by analyzing a pixel intensity difference. Here, the pixel intensity difference is a difference in R, G, and B values between each frame pixel and the reference pixel.

In addition, the object detection system 100 sets a threshold to determine a background and a foreground. When the object detection system 100 determines to segment a background and a foreground from the input frame, the object detection system 100 updates the reference background sample by calculating a changed background and a moving average in a background part, and then generates an updated reference background sample.

Additionally, the object detection system 100 outputs a part other than the background as a foreground after changing the threshold. Further, when the foreground is output from the input frame, the object detection system 100 removes noise from the foreground through post-processing and outputs a filtered surface of the moving object part by filling a hole that is a part of the background output as the foreground.

For example, if the background is a mountain and the foreground is a vehicle, the mountain seen through vehicle glass appears in a form of a hole in the foreground. The mountain shown in the form of a hole in the foreground is automatically filled through post-processing techniques, such as a flood fill operation. Here, there are various methods for filling the hole in the foreground shown in the form of a hole. Thus, the embodiment of the present invention does not limit to any one method.

A method for extracting a moving object in a video by the above-described object detection system 100 will be described with reference to FIG. 2 and FIG. 3.

Figure 2:
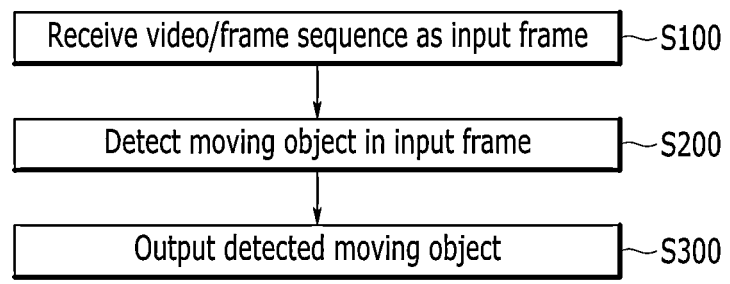
FIG. 2 is a flowchart showing a method for detecting a moving object in a video according to an embodiment of the present invention.

FIG. 2 is a flowchart showing a method for detecting a moving object in a video according to an embodiment of the present invention.

As shown in FIG. 2, an object detection system 100 receives a video or a frame sequence as an input frame (S100). At this time, a color image including edge information due to not being smoothed is received as the input frame.

The object detection system 100 detects a moving object in the input frame (S200) and then outputs the detected moving object (S300). Here, a procedure for detecting a moving object in step S200 will be described with reference to FIG. 3.

Figure 3:
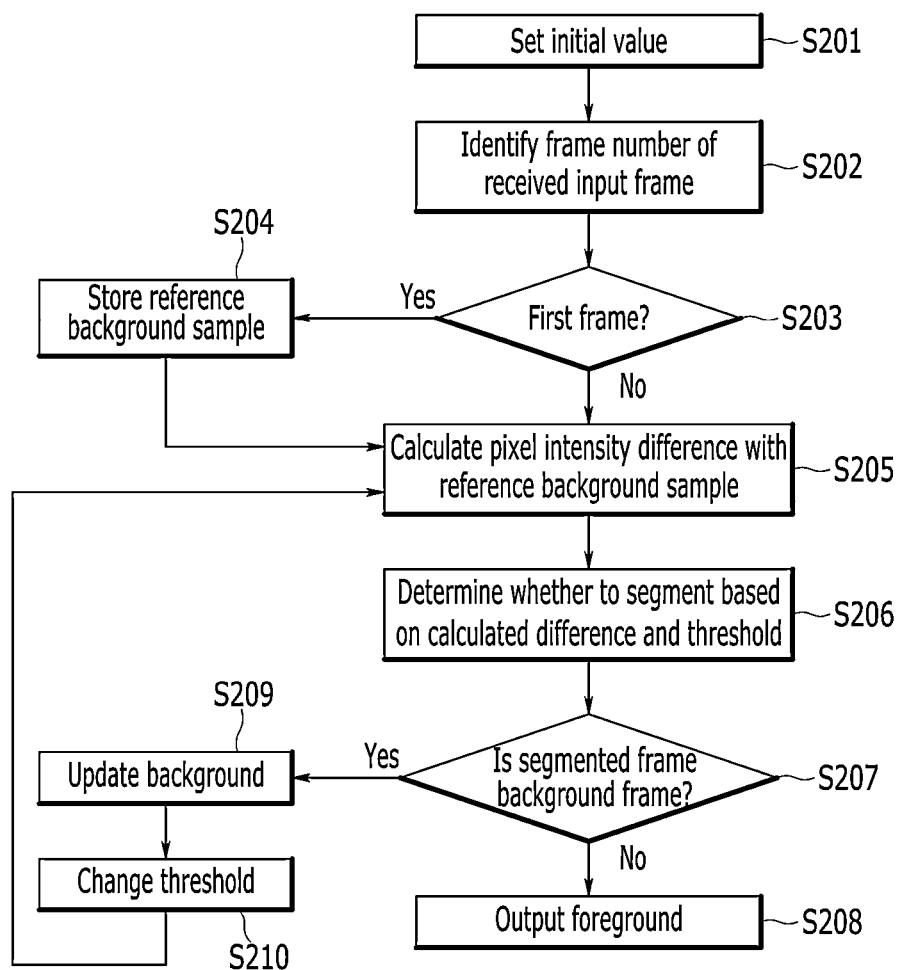
FIG. 3 is a flowchart illustrating an object detection procedure according to an embodiment of the present invention.

FIG. 3 is a flowchart illustrating an object detection procedure according to an embodiment of the present invention.

As shown in FIG. 3, an object detection system 100 executes an initial value setting procedure (S201).

The initial value set in step S201 is to initialize a per-pixel threshold $T(x, y)$, and the per-pixel threshold is a value set in order to determine whether a corresponding frame of the input frame is a background or a foreground. The per-pixel threshold is calculated as a product of an initial threshold and a threshold factor as shown in Equation 1.

$$T(x,y) = T\min H(x,y) \quad \text{Equation 1}$$

Here, Tmin is an initial threshold. The initial threshold is assigned a predetermined value when the object detection system 100 is driven for the first time, and then is updated by a segmentation determination algorithm.

H(x, y) is a threshold factor, that is, an arbitrary variable for setting the initial threshold. Likewise, the threshold factor is assigned a predetermined value initially. In the embodiment of the present invention, a procedure where the initial value is set after the input frame is input to the object detection system 100 is described as an example, but the present invention is not limited thereto.

After the initial value is set as described above, the object detection system 100 identifies a frame number of the input frame received from the outside (S202), and checks whether the input frame is a first frame of the video (S203). A method for identifying the frame number in the input frame, a form in which the frame number is inserted into an input frame, and the like are already known in the art. In an embodiment of the present invention, the method and the form are not limited to any one method and form.

If the frame input in step S202 is the first frame, the object detection system 100 stores a reference background sample for the first frame (S204).

The background sample is pixels located in the neighborhood of a target pixel, and it is assumed that pixels of the background sample are located in the n×n neighborhood of the (x, y) pixel on the coordinates. Before segmenting a background and a foreground from the input frame, the object detection system 100 initializes a background sample $B^C(x, y)$ in the first frame and then stores the initialized background sample as the reference background sample. At this time, the object detection system 100 initializes the background sample according to Equation 2 as follows.

$$B^C(x,y) = \{B_0^C(x,y), B_1^C(x,y) \ldots B_{N-1}^C(x,y)\} \quad \text{Equation 2}$$

Here, each $B_i^C(x, y)$ is referred to as a background pixel of $B^C(x, y)$. 'i' of $B_i^C(x, y)$ satisfies i∈[0, N−1], and channel c satisfies c∈{R, G, B}. Namely, all pixels of 1×1 size constituting one frame are composed of a first neighbor pixel to a N-th neighbor pixel by using a 7×7 window, being a predetermined size. Further, the background pixels including from a first neighbor pixel to a N-th neighbor pixel are constituted, and each pixel includes R, G, and B color values.

However, when it is determined that the input frame is not the first frame in step S203, the object detection system 100 drives the segmentation determination algorithm. Then, a pixel intensity difference between the reference background sample stored in step S204 and the input frame is calculated (S205). Here, the pixel intensity means a difference in the R, G, and B values of each pixel.

The object detection system 100 determines whether to segment the input frame based on the difference calculated in step S205 and the threshold value initially set in step S201 (S206).

For this, in the embodiment of the present invention, an analysis target frame to be analyzed by applying the segmentation determination algorithm is defined as $I_O^C$, and an analysis target pixel among pixels included in the analysis target frame is defined as $I_O^C(x, y)$. In addition, the segmented frame is defined as Sr, and pixels in the segmented frame are defined as Sr(x, y). Further, a background and a foreground segmented in the analysis target pixel are defined as 0 and 1, respectively.

The object detection system 100 checks whether the analysis target pixel is similar to the reference background sample $B_i^C(x, y)$, based on the segmentation determination algorithm. If the analysis target pixel is not similar to the pixel of the reference background sample, the object detection system 100 determines the analysis target pixel as the foreground. However, if the analysis target pixel is similar to the pixel of the reference background sample, the object detection system 100 determines the analysis target pixel as the background. At this time, the segmentation determination algorithm can be defined as in Equation 3

$$S_r(x, y) = \begin{cases} 1, & \text{if } \sum_{i=0}^{N-1} M_i(x, y) < M_{min} \\ 0, & \text{otherwise,} \end{cases} \quad \text{Equation 3}$$

Here, $M_{min}$ is a minimum number of matches for determining whether pixels are similar. In an embodiment of the present invention, the value of $M_{min}$ is set to 2.

$M_i(x, y)$ is a similarity measurement counter. $M_i(x, y)$ is the number of times of determination that an analysis target pixel is similar to a pixel of the reference background sample when a pixel intensity difference between the analysis target pixel and the pixel of the reference background sample is less than or equal to the threshold T(x, y).

That is, the object detection system 100 compares the analysis target pixel with the pixel of the reference background sample. When the similarity obtained through a similarity measurement method is small ($\Sigma_{i=0}^{N-1} M_i(x, y) \leq M_{min}$), the object detection system 100 determines the analysis target pixel as the foreground. When the similarity is large, the object detection system 100 determines the analysis target pixel as the background. Here, the similarity measurement method can be defined as in Equation 4 when i satisfies i∈[0, N−1] and c satisfies c∈{R, G, B}.

$$M_i(x, y) = \begin{cases} 1, & \text{if } \exists c | I_O^c(x, y) - B_i^c(x, y)| \leq T(x, y) \\ 0, & \text{otherwise,} \end{cases} \quad \text{Equation 4}$$

Here, $|I_O^C(x, y) - B_i^C(x, y)|$ Y is a Manhattan distance between the analysis target pixel and a pixel of the reference background sample. Since Manhattan distance method for comparing a distance between two pixels is already known, a detailed description thereof will be omitted in an embodiment of the present invention.

When the Manhattan distance between the analysis target pixel and the pixel of the reference background sample in all of the R, G, and B channels is less than or equal to a threshold, the object detection system 100 determines that the corresponding pixel is the foreground. However, if the Manhattan distance in all channels is greater than the threshold, the pixel is determined as the background. The above-described process is defined as a logical sum (OR) fusion strategy in the embodiment of the present invention.

The object detection system 100 checks whether the frame segmented with the segmentation determination algorithm is the background frame (S207). If the foreground is segmented, the object detection system 100 outputs the foreground after removing the noise and filling a hole through post-processing (S208).

However, if it is determined that the background is segmented in step S207, the object detection system 100 updates the reference background sample stored in step S204 with the segmented background part (S209). Then, the object detection system 100 updates the threshold with the corresponding R, G, and B color values (S210). Then, the procedure after step S205 is iterated.

An example of detecting a moving object in a video through the above-described procedure will be described with reference to FIG. 4.

Figure 4:
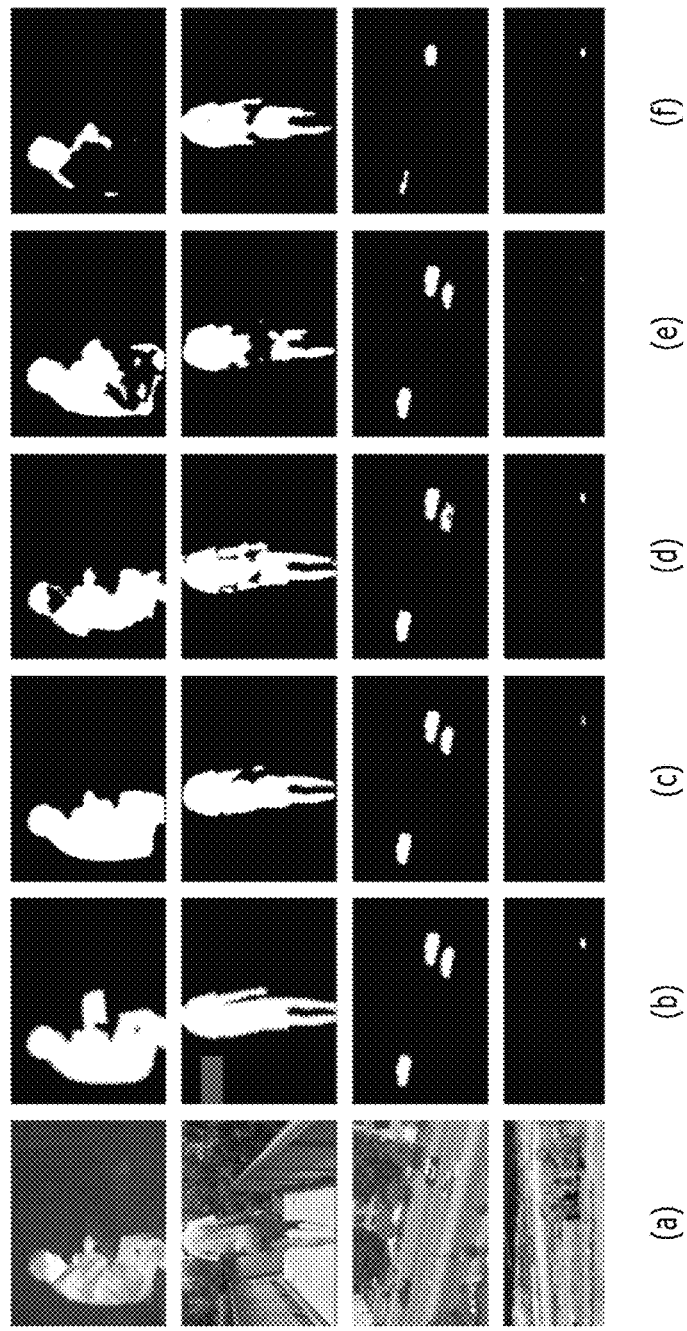
FIG. 4 is an example diagram illustrating a detection of a moving object in a video according to an embodiment of the present invention.

FIG. 4 is an example diagram illustrating a detection of a moving object in a video according to an embodiment of the present invention.

In order to check the accuracy of an object detection according to an embodiment of the present invention, results of object detections using $M^4CD$ method, SuBSENSE method, and DeepBS method, being conventional methods, are also shown for qualitative comparison as shown in FIG. 4.

As shown in FIG. 4 (*a*), four frames having a complicated scene is selected and used as input frames. FIG. 4 (*b*) shows ground-truth of an object, and FIG. 4 (*c*) shows an object detection result extracted by a method according to an embodiment of the present invention. Further, FIG. 4 (*d*) to FIG. 4 (*f*) show results of detecting a moving object in a video with $M^4CD$ method, SuBSENSE method, and DeepBS method, respectively.

As shown in FIG. 4, when a moving object is detected by the method according to an embodiment of the present invention, it can be seen that a silhouette of an object is more accurately detected than other methods. In the embodiment of the present invention, since an unsmoothed image is received as an input frame, an improvement of object detection performance can be obtained due to all the preserved edge information. In addition, the OR fusion strategy can detect more changes than other fusion techniques.

Figure 5:
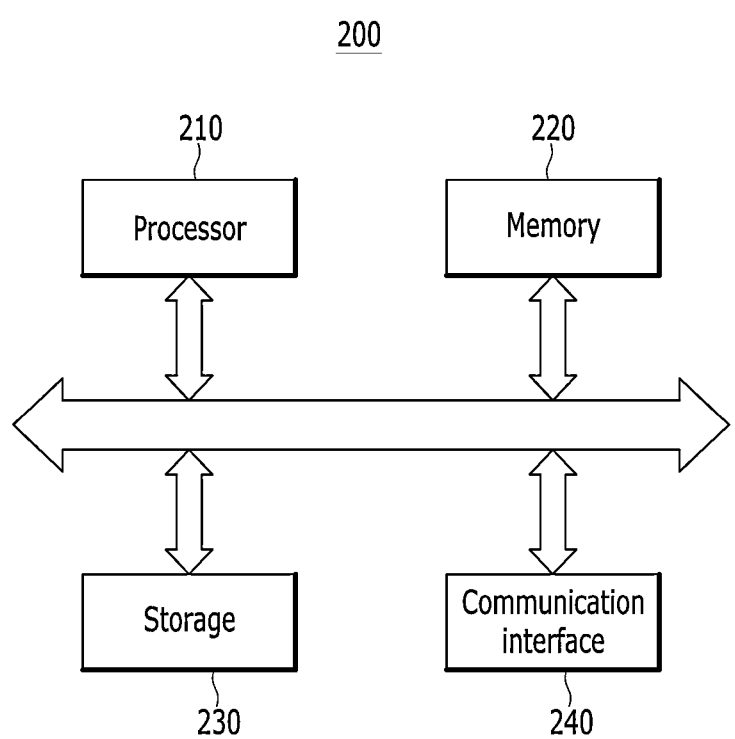
FIG. 5 is a configuration diagram of a computing device according to an embodiment of the present invention.

FIG. 5 is a configuration diagram of a computing device according to an embodiment of the present invention.

As shown in FIG. 5, an object detection system 100 executes a program including instructions described to execute an operation of the present invention in a computing device 200 operated by at least one processor.

Hardware of the computing device 200 may include at least one processor 210, a memory 220, a storage 230, and a communication interface 240, and may be connected via a bus. In addition, the hardware, such as an input device and an output device, may be included. Various software, including an operating system capable of executing a program, may be loaded into the computing device 200.

A processor 210 is a device for controlling the operation of the computing device 200, and may be a processor 210 of various types for processing instructions included in a program. For example, the processor may be a central processing unit (CPU), a micro processor unit (MPU), a micro controller unit (MCU), a graphic processing unit (GPU), and the like. The memory 220 loads a corresponding program so that the instructions described to execute the operation of the present invention are processed by the processor 210. The memory 220 may be, for example, a read only memory (ROM), a random access memory (RAM), and the like. The storage 230 stores various data, programs, and the like which are required for executing the operation of the present invention. The communication interface 240 may be a wired/wireless communication module.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method for extracting a moving object in a video by an object detection system operated by at least one processor, the method comprising:

receiving a certain unsmoothed frame included in the video;

when the certain frame is a first frame of the video, initializing a background sample for a target pixel in the first frame, and storing the initialized background sample as a reference background sample, the reference background sample including a plurality of neighboring pixels of the target pixel as a plurality of reference pixels, and the neighboring pixels being pixels within a window having a predetermined size;

when the certain frame is not the first frame of the video, calculating a pixel intensity difference between each of the plurality of reference pixels of the reference background sample extracted from the first frame of the video and the target pixel of the certain frame;

counting a number of times the pixel intensity difference is less than or equal to a predetermined threshold in the plurality of reference pixels, and determining the number of reference pixels as a similarity measurement value; and segmenting the target pixel into the background or the foreground according to the similarity measurement value, and extracting the foreground from the certain frame as an object.

2. The method of claim 1, wherein initializing the background sample comprises generating the background sample including R, G, and B color values of each of from the plurality of neighboring pixels.

3. The method of claim 1, wherein calculating the pixel intensity difference comprises extracting a difference in R value, G value, and B value between each of the plurality of reference pixels of the reference background sample and the target pixel of the certain frame.

4. The method of claim 1, wherein the similarity measurement value is measured using a Manhattan distance between the target pixel and each of the plurality of reference pixels.

5. The method of claim 4, wherein extracting the foreground from the certain frame as the object comprises segmenting a pixel whose similarity measurement value is less than a predetermined minimum number of matches into the foreground, and segmenting a pixel whose similarity measurement value is greater than the minimum number of matches into the background.

6. The method of claim 5, wherein extracting the foreground from the certain frame as the object comprises removing noise from the foreground and filling a hole included in the foreground from which the noise is removed.

7. The method of claim 5, further comprising:

updating the reference background sample with pixels segmented into the background in the certain frame; and changing the predetermined threshold.

8. A system for extracting a moving object in a video comprising:

an interface that receives the video from a video collection device; and a processor, wherein the processor:

initializes a background sample in for a target pixel a first frame included in the video, and stores the initialized background sample as a reference background sample, the reference background sample including a plurality of neighboring pixels of the target pixel as a plurality of reference pixels, and the neighboring pixels being pixels within a window having a predetermined size, for a target pixel of a certain unsmoothed frame being not the first frame and included in the video, calculates a pixel intensity difference between each of the plurality of reference pixels of the reference background sample extracted from the first frame of the video and the target pixel, counts a number of times the pixel intensity difference is less than or equal to a predetermined threshold in the plurality of reference pixels, and determines the number of reference pixels as a similarity measurement value; and segments the target pixel into the background or the foreground based on a similarity measurement value between each reference pixel, and extracts the foreground from the certain frame as an object.

9. The system of claim 8, wherein the processor segments a pixel whose similarity measurement value is less than a predetermined minimum number of matches into the foreground, and segments a pixel whose similarity measurement value is greater than the minimum number of matches into the background.

10. The system of claim 9, wherein the processor removes noise from the foreground and fills a hole included in the foreground from which the noise is removed.

* * * * *